(12) United States Patent
Hao et al.

(10) Patent No.: US 8,929,344 B2
(45) Date of Patent: Jan. 6, 2015

(54) METHOD AND SYSTEM FOR BLIND CHANNEL IMPULSE RESPONSE COMBINING FOR NOISE MITIGATION IN CHANNEL ESTIMATION IN A TD-SCDMA RECEIVER

(75) Inventors: Yonggang Hao, Waltham, MA (US); Jianwei Zhang, Beijing (CN); Aiguo Yan, Andover, MA (US); Songsong Sun, Tustin, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 241 days.

(21) Appl. No.: 13/314,159

(22) Filed: Dec. 7, 2011

(65) Prior Publication Data
US 2013/0094476 A1    Apr. 18, 2013

(30) Foreign Application Priority Data
Oct. 18, 2011    (CN) .......................... 2011 1 0316463

(51) Int. Cl.
*H04B 7/216*    (2006.01)
*H04L 25/02*    (2006.01)
(52) U.S. Cl.
CPC ........ *H04L 25/0204* (2013.01); *H04L 25/0212* (2013.01); *H04L 25/0216* (2013.01); *H04L 25/0238* (2013.01)
USPC ......................................... 370/335

(58) Field of Classification Search
USPC .......... 370/335, 210; 375/231, 343, 260, 341; 455/423, 562.1
See application file for complete search history.

(56) References Cited

U.S. PATENT DOCUMENTS

| | | | |
|---|---|---|---|
| 2001/0031647 A1* | 10/2001 | Scherzer et al. | 455/562 |
| 2004/0052236 A1* | 3/2004 | Hwang et al. | 370/342 |
| 2008/0167030 A1* | 7/2008 | Li et al. | 455/423 |
| 2009/0010228 A1* | 1/2009 | Wang et al. | 370/335 |
| 2009/0296788 A1* | 12/2009 | Hottinen | 375/219 |

* cited by examiner

*Primary Examiner* — Andrew Lai
*Assistant Examiner* — Jamaal Henson
(74) *Attorney, Agent, or Firm* — Winston Hsu; Scott Margo

(57) ABSTRACT

Blind channel impulse response combining for noise mitigation in channel estimation in a TD-SCDMA receiver includes applying a correlation function to pairs of channel impulse response windows associated with non-desired user equipments, grouping all those channel impulse response windows having a correlation function above a predetermined threshold as identified with the same user equipment, and combining the channel estimation results from each identified user equipment in the group to mitigate noise.

20 Claims, 5 Drawing Sheets

METHOD AND SYSTEM FOR BLIND CHANNEL IMPULSE RESPONSE COMBINING FOR NOISE MITIGATION IN CHANNEL ESTIMATION IN A TD-SCDMA RECEIVER

BACKGROUND

This invention relates to a method and system for blind channel impulse response combining for noise mitigation in channel estimation in a TD-SCDMA receiver.

Channel estimation is one of the essential function blocks in a TD-SCDMA receiver: it provides instant fading channel parameters to an inner receiver with the aid of the training sequence, called a midamble, carried over each time slot. Since a TD-SCDMA system is an interference limited system, capability of multi-cell joint detection on mobile receivers helps improve the down link performance, e.g., block error rate, ThroughPut etc. This requires a multi-cell channel estimation function block. TD-SCDMA systems may employ beam forming with smart antennas. Thus, signals for different user equipments (UE) in the same cell may experience differently fading channels. Since TD-SCDMA employs Joint Detection (JD), which requires knowledge of all these fading channels, several training sequences may be transmitted simultaneously so that a user equipment can estimate all these fading channels. This is known as default midamble allocation (DMA) mode in TD-SCDMA. With the same total power transmitted from the base station, power allocated to each training sequence in the default midamble allocation scheme is less than that in the scheme associated with only one training sequence for all equipments. Thus, the quality of channel estimation in default midamble allocation mode might be worse. If one user equipment is assigned with several channelization codes, it may occupy several training sequences, although fading channels these training sequences and corresponding channelization codes experience are identical. One way to improve the quality of channel estimation in default midamble allocation cases is to combine the channel estimation results from these midambles belonging to the same user equipments to mitigate the noise. One commonly used combining method is maximum ration combining (MRC). This combining is particularly useful in high speed downlink packet access (HSDPA) scenarios where one user equipment normally takes more than one training sequence.

To carry out this combining action, a user equipment should know the detailed allocation of these midamble sequences. It is not an issue for the midambles allocated to the desired user equipment in a home cell, where such information is available and can be forwarded to the user equipment through a higher layer data. However, for other non-desired midambles such as those from home cell not associated with that user equipment or any midambles from other than the home cell, information is not available at the receiver end. Particularly when multi-cell channel estimation is considered, information of neighboring cell training sequence allocations is not accessible to user equipments in general.

SUMMARY

It is therefore an object of this invention to provide am improved method and system for blind channel impulse response combining for noise reduction in a TD-SCDMA receiver.

It is a further object of this invention to provide such an improved method and system which identifies and groups channel impulse response windows identified with the same home cell non-desired user equipments and/or neighboring cell user equipments for combining for noise mitigation.

The invention results from the realization that an improved approach to grouping the non-desired channel impulse response (CIR) windows from home cell, as well as neighboring cell, user equipments by applying a correlation function to pairs of channel impulse response windows associated with a number of different user equipments and combining the channel estimation results from each identified user equipment to mitigate noise.

The subject invention, however, in other embodiments, need not achieve all these objectives and the claims hereof should not be limited to structures or methods capable of achieving these objectives.

This invention features a method of blind channel impulse response combining for noise mitigation in channel estimation in a TD-SCDMA receiver including applying a correlation function to pairs of channel impulse response windows associated with non-desired user equipments, grouping all those channel impulse response windows having a correlation function above a predetermined threshold as identified with the same user equipment, and combining the channel estimation results from each identified user equipment in the group to mitigate noise.

In preferred embodiments the correlation function may be applied to adjacent pairs of channel impulse response windows. The correlation function may be a correlation coefficient. The combining of the channel estimation results may include maximum ration combining. The number of user equipments may include home cell non-desired user equipments. The number of user equipments may include all neighbor cell user equipments. The correlation function may be $$\gamma_{k,l} \frac{\langle \hat{\underline{h}}_k\ \hat{\underline{h}}_l \rangle}{\sqrt{\langle \hat{\underline{h}}_k\ \hat{\underline{h}}_k \rangle \langle \hat{\underline{h}}_l\ \hat{\underline{h}}_l \rangle}}$$

generated according to: where $\hat{\underline{h}}_k$ is the kth CIR window and $\langle \hat{\underline{h}}_k\ \hat{\underline{h}}_l \rangle$ indicates inner product of $\hat{\underline{h}}_k$ and $\hat{\underline{h}}_l$.S The invention also features a system for blind channel impulse response combining for noise mitigation in channel estimation in a TD-SCDMA receiver including a calculation circuit for applying a correlation function for pairs of channel impulse response windows associated with a number of non-desired user equipments, a comparator channel impulse response for grouping those user equipments identified with the channel impulse response windows having a correlation threshold above a predetermined threshold, and a combining circuit for combining the channel impulse response windows of the user equipments in a group for mitigating noise.

In preferred embodiments the correlation function may be applied to adjacent pairs of channel impulse response windows. The correlation function may generate a correlation coefficient. The combining circuit may include a maximum ratio combining.

The number of user equipments may include home cell non-desired user equipments. The number of user equipments may include all neighbor cell user equipments. The correlation function may be generated according to:

$$\gamma_{k,l} \frac{\langle \hat{\underline{h}}_k \, \hat{\underline{h}}_l \rangle}{\sqrt{\langle \hat{\underline{h}}_k \, \hat{\underline{h}}_k \rangle \langle \hat{\underline{h}}_l \, \hat{\underline{h}}_l \rangle}}$$

where $\hat{\underline{h}}_k$ is the kth CIR window and $\langle \hat{\underline{h}}_k \, \hat{\underline{h}}_l \rangle$ indicates inner product of $\hat{\underline{h}}_k$ and $\hat{\underline{h}}_l$.S.

This invention also features a system for blind channel impulse response combining for noise mitigation in channel estimation in a TD-SCDMA receiver including a processor configured to: calculate a correlation function for pairs of channel impulse response windows associated with a number of different non-desired user equipments, grouping all channel impulse response windows having a correlation function above a predetermined threshold as identified with the same user equipment, and combining the channel estimation results from each identified user equipment in the group to mitigate noise.

In preferred embodiments the correlation function may be applied to adjacent pairs of channel impulse response windows. The correlation function may be a correlation coefficient. The combining of the channel estimation result may include maximum ratio combining. The number of user equipments may include home cell non-desired user equipments. The number of user equipments may include neighbor cell non-desired user equipments.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

Other objects, features and advantages will occur to those skilled in the art from the following description of a preferred embodiment and the accompanying drawings, in which.

DETAILED DESCRIPTION

Figure 1:
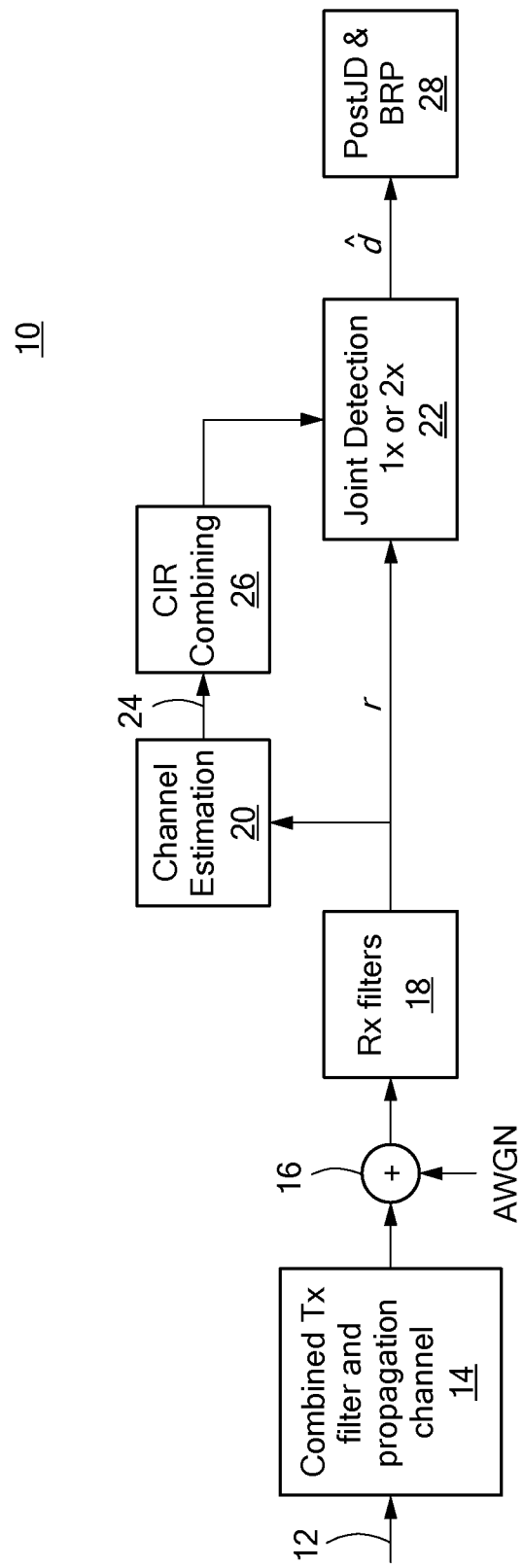
FIG. 1 is a block diagram of TD-SCDMA receiver using a channel impulse response combining circuit according to one embodiment of this invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

There is shown in FIG. 1 a TD-SCDMA receiver 10 including a blind channel impulse response combining circuit according to this invention. The input signal at 12 is submitted through a combined transmitter filter and propagation channel 14 whose output is combined in summer 16 with additive white Gaussian noise (AWGN) and submitted to receiver filters 18. From there the signal is delivered to the channel estimation circuit 20 and also to joint detection circuit 22 which may operate at a sample rate of 1× or 2× for example. The channel estimation results at 24 are then submitted to a channel impulse response combining circuit 26 according to this invention. This output is also submitted to the joint detection circuit 22 which provides the ultimate output to the post joint detection and bit rate processor 28 in a conventional fashion.

Figure 2:
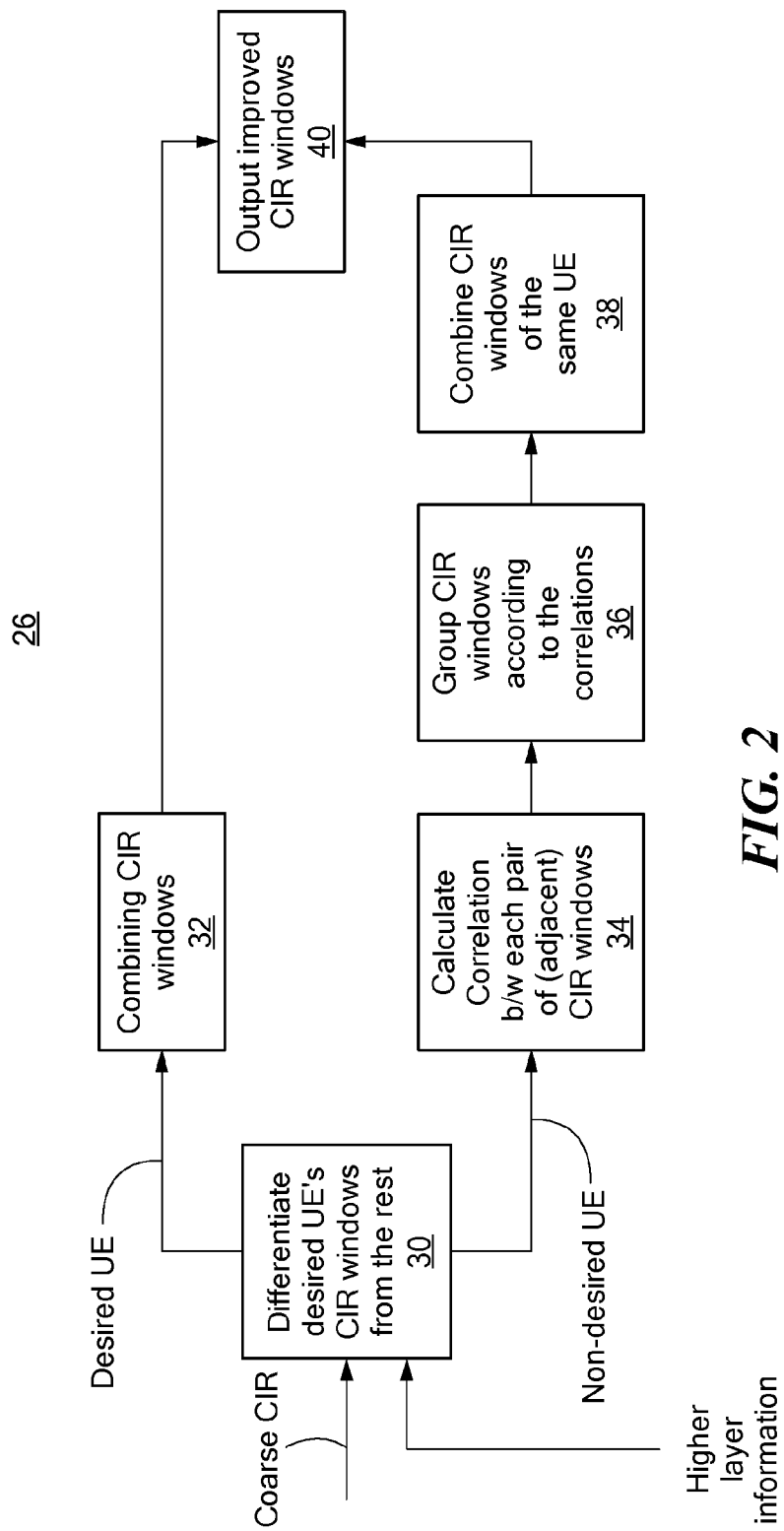
FIG. 2 is a more detailed block diagram of the channel impulse response combining circuit of FIG. 1 according to one embodiment of this invention.

In one embodiment channel impulse response combining circuit 26, FIG. 2, includes a differentiating circuit 30 which receives a coarse channel impulse response and a higher layer of information from the cell to differentiate the desired user equipment channel impulse response windows from the non-desired user equipments channel impulse response windows. The desired user equipment windows are directed to a combining circuit 32 which combines the channel impulse response windows for the desired user equipment. The non-desired user equipments' windows are delivered to a correlation circuit 34 where there is calculated the correlation between pairs of channel impulse response windows. In a preferred embodiment the comparison of the coefficient values is between adjacent channel impulse response windows. A desired user equipment is the one that this embodiment is implemented in; non-desired user equipments are all others that the home cell or neighboring cells send signals to together with that for desired user equipment. The correlation coefficients generated by correlation circuit 34 are compared and those channel impulse response windows that have a correlation coefficient above a predetermined value, e.g. 0.8, are grouped and identified as being associated with the same user equipment. All of those channel impulse response windows in each identified group are then combined in combining circuit 38 to mitigate noise. The outputs from both combining circuit 38 for the non-desired user equipments' channel impulse response windows and combining circuit 32 for the desired user equipment's channel impulse response windows are delivered to the output 40 to provide improved channel impulse response windows.

Figure 3:
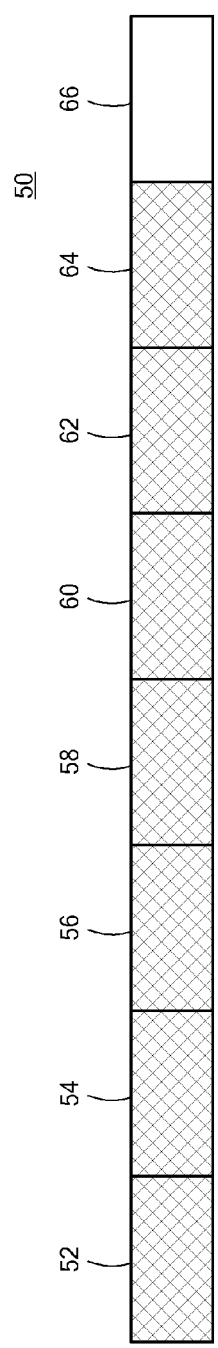
FIG. 3 is a schematic diagram of the channel impulse response windows of a neighboring cell.

The method and system explained here can be applied to both non-desired user equipments in the home cells and the user equipments in neighboring cells. For simplicity of explanation the disclosure uses neighboring cells channel impulse response combining as one embodiment of the invention. The following procedures of neighboring cells channel impulse response combining applies to each neighboring cell independently if there are more than one neighboring cells. Initially the rough channel impulse response estimation of a neighboring cell is obtained in any one of a number of ways, for example, interference cancellation (IC) including both successive interference cancellation (SIC) and parallel interference cancellation (PIC). A neighboring cell's rough channel impulse response estimation may appear as in FIG. 3 where each block 52, 54, 56, 58, 60, 62, 64, and 66 indicates a channel impulse response window corresponding to a midamble sequence. Each channel impulse response window is a sequence of channel impulse response taps. In this case there are 16 taps in eight windows or 128 taps altogether. The shaded windows 52-64 indicate active midambles and the blank window 66 indicates a non-active midamble. Since the user equipment doesn't know the allocations of the midambles (and the corresponding channel impulse response windows) except for its own, in the case of non-desired user equipments' windows the first thing the user equipment does before combining is to decide which channel impulse response windows belong to the same user equipment. To do this a grouping method with correlation among the channel impulse response windows is taught by this invention.

Figure 4:
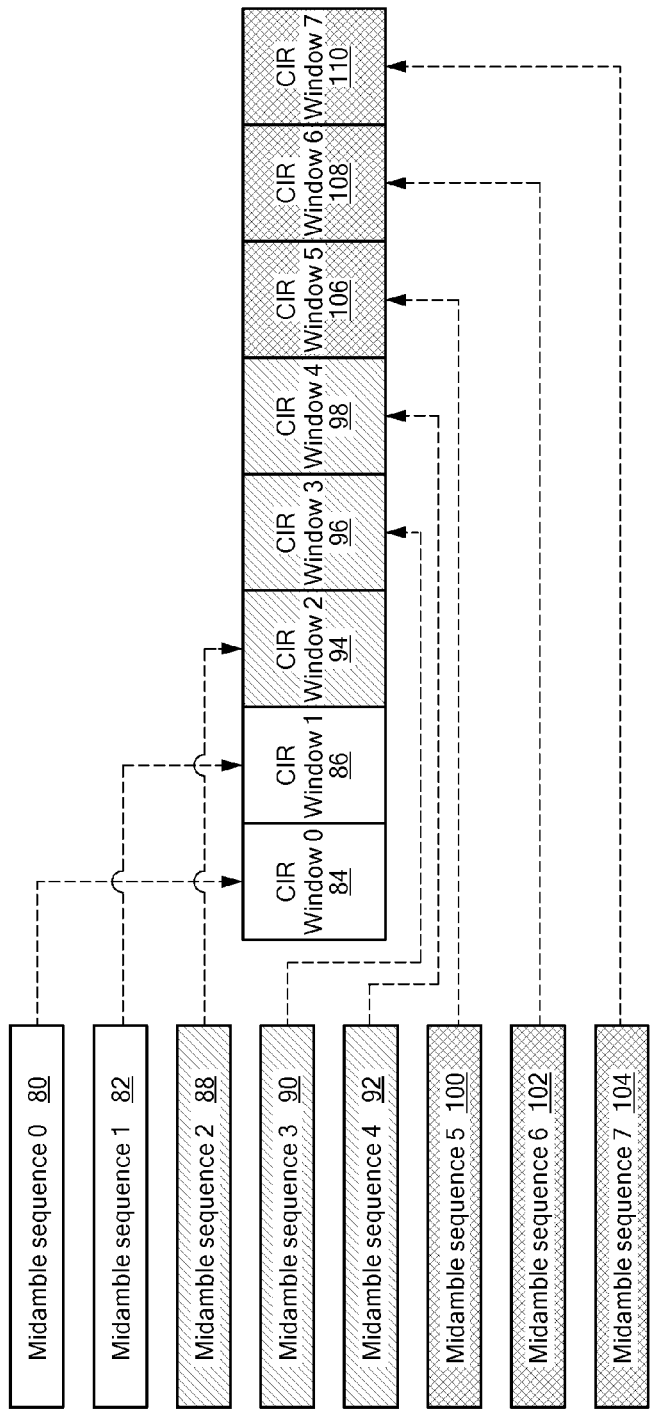
FIG. 4 is a diagrammatic map of the association between midamble sequences and channel impulse response windows.

In a TD-SCDMA system with default midamble allocation scheme, if there is more than one midambles (and correspondingly more than one channel impulse response windows) for any user equipment, these channel impulse response windows will typically be adjacent one another. An illustration of the fact that midamble sequences from the same user equipment typically follow each other in succession is depicted in FIG. 4 where the midamble sequences 80 and 82 result in successive channel impulse response windows 84 and 86. Midamble sequences 88, 90 and 92 result in successive channel impulse response windows 94, 96, and 98 and midamble sequences 100, 102, and 104 result in successive channel impulse response windows 5, 6, and 7, 106, 108, and 110. The invention contemplates generating correlation Coefficients between any and all pairs of channel impulse response windows. It is preferred to obtain the correlation coefficients between adjacent windows since it reduces computation complexity. The correlation coefficients are then used as a decision metric for grouping the channel impulse response windows with the proper identified user equipment. The correlation coefficient obtained by correlation circuit 34, FIG. 2, between two adjacent channel impulse response windows is defined as follows:

$$\gamma_{k,l} = \frac{\langle \hat{h}_k, \hat{h}_l \rangle}{\sqrt{\langle \hat{h}_k, \hat{h}_k \rangle \langle \hat{h}_l, \hat{h}_l \rangle}}$$

where $\hat{h}_k$ is the $k^{th}$ CIR window where $\hat{h}_k$ is the kth CIR window and $\langle \hat{h}_k, \hat{h}_l \rangle$ indicates inner product of $\hat{h}_k$ and $\hat{h}_l$.S.

The grouping criterion is:

if Re{$\gamma_{k,k+1}$}>$\gamma_{threshold}$, $\hat{h}_k$ and $\hat{h}_{k+1}$ belong to same UE    (2)

The threshold, $\gamma_{threshold}$, is a design parameter. It can be chosen upon field trials and based on previous experience a threshold of 0.8 is chosen. Note that if two channel impulse response windows belong to the same user equipment, then the correlation coefficient between these two channel impulse response windows would be large when the neighboring cell interference is strong. If fact, strong interference is the case where multi-cell channel estimation (MCCE) is beneficial. Thus, in general there are high correlation coefficient values for those channel impulse response windows belonging to the same user equipment. In general, for those channel impulse response windows belonging to different user equipments on the other hand, a much smaller correlation will be seen over a long observation period.

Figure 5:
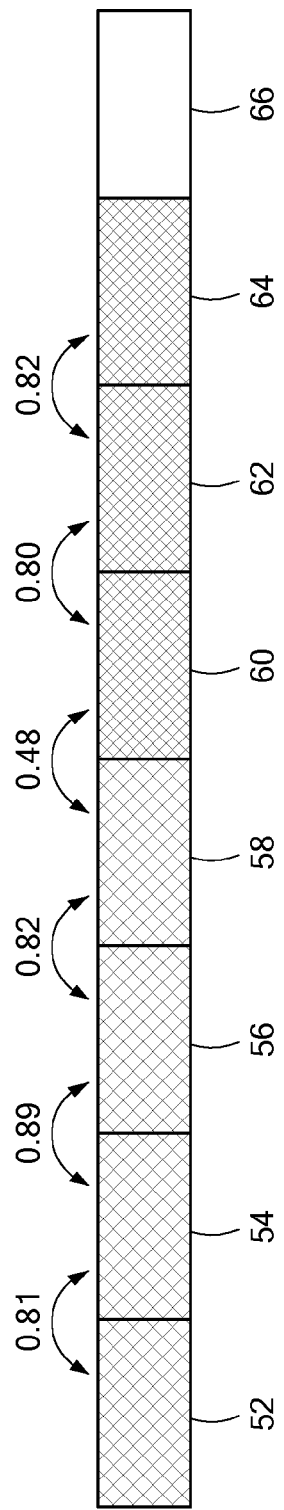
FIG. 5 is a diagrammatic map of channel impulse response windows showing correlation coefficients among channel impulse response windows.

After the correlation coefficients are generated by correlation circuit 34, FIG. 2, the correlation coefficients may have for example the values shown in FIG. 5. The correlation coefficient between channel impulse response windows 52 and 54 is 0.81, between 54 and 56 is 0.89, between 56 and 58 is 0.82. Using 0.8 as a threshold results in all four of those channel impulse response windows begin grouped with the same user equipment. Contrastingly the correlation coefficient between channel impulse response windows 58 and 60 is only 0.48 showing no correlation and indicating that they are not associated with the same user equipment. Continuing, the correlation coefficient generation between channel impulse response windows 60 and 62 is 0.8 and between windows 62 and 64 is 0.82 indicating that in fact these three correlate well and are associated with yet another user equipment. Thus, having determined how the non-desired user equipments' channel impulse response windows can be grouped, those belonging to the same user equipment grouping can be combined in the usual way to mitigate the noise. An optimal way of combining for this purpose is the maximum ratio combining (MRC). For example, suppose one group has N channel impulse response windows, $\hat{h}_j$, j=1, . . . , N. Then the combined results will be:

$$\hat{h}_i = \alpha_i \sum_{j=0}^{N} \alpha_j \hat{h}_j \qquad (3)$$

$$\alpha_i = \sqrt{\frac{Pwr_i}{\sum_{j=1\sim N} Pwr_j}}$$

$\hat{h}_j$: $j^{th}$ CIR window $Pwr_j$: the power of $j^{th}$ CIR window

Figure 6:
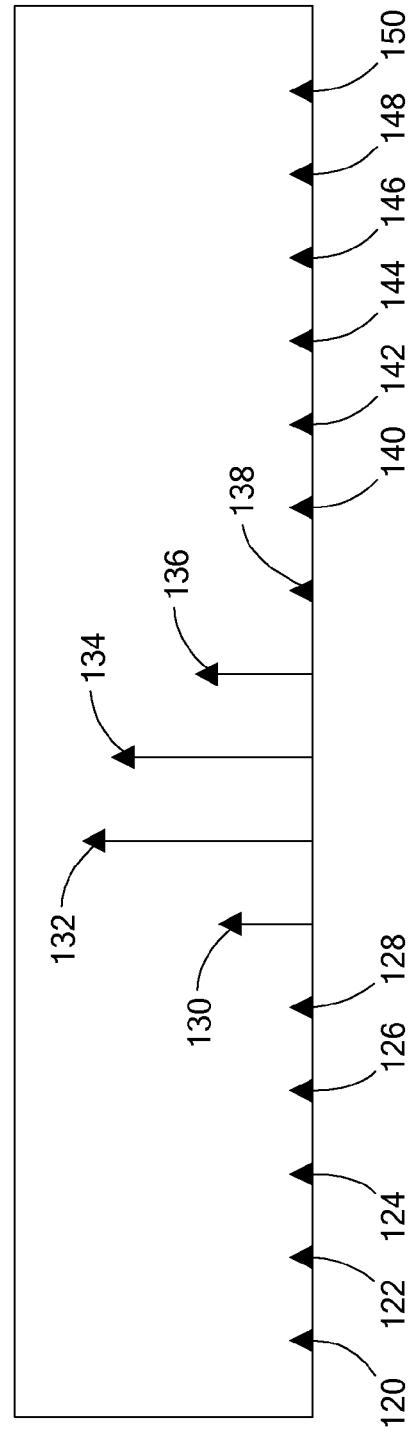
FIG. 6 is a schematic view of a typical 16 tap channel impulse response window of FIGS. 3, 4, and 5.

To reduce the computation complexity, a sub-optimal combining method can use the magnitude of peak tap in each channel impulse response window instead of the square root of power. $\alpha_1$ as the weight value. Thus, in FIG. 6 instead of taking the square root of the sum of the squares of each of the taps 120-150, the peak value of tap 132 could be used.

Figure 7:
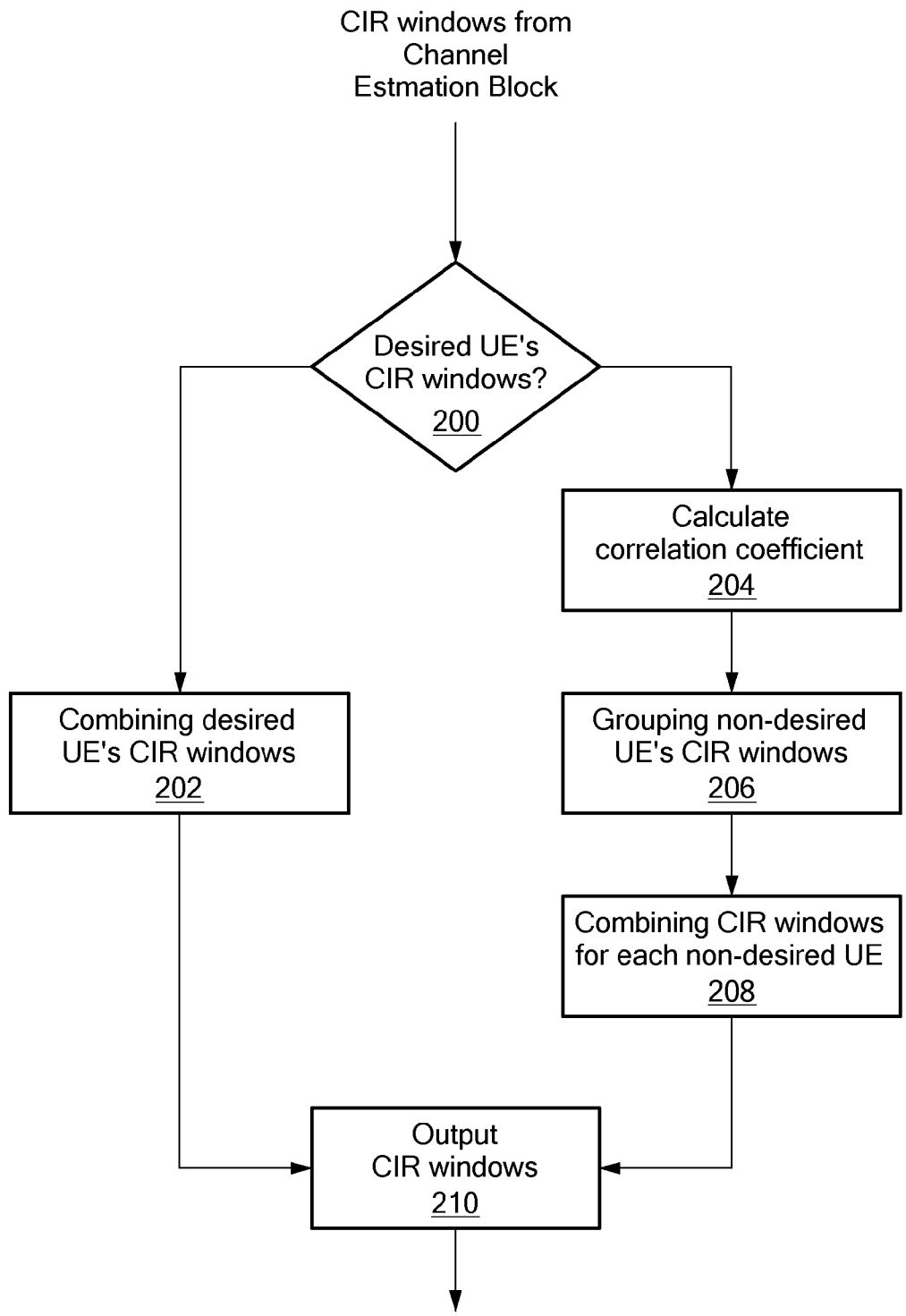
FIG. 7 is a flow chart depicting one embodiment of the method of this invention.

A preferred method according to this invention of implementing the blind channel impulse response combining for noise mitigation is shown in FIG. 7 where the channel impulse response windows from the channel estimation block are first checked whether they are of the desired user equipment 200. If they belong to the desired user equipment, then the combining takes place forthrightly 202. If they are of non-desired user equipments the correlation coefficients are calculated, 204, after which the particular metric for the correlation coefficient is used to group the identified non-desired user equipments' channel impulse response windows 206. The grouped channel impulse response windows for each of these non-desired user equipments are then combined to mitigate the noise 208 after which the channel impulse response windows of both the desired and non-desired user equipments, having undergone the combining to mitigate noise, are provided at the output as improved channel impulse response windows 210.

In an iterative multi-cell channel estimation approach, for example, using successive interference cancellation this neighboring cell channel impulse response combining can be applied after each iteration and that may improve the quality of the feedback in the next iteration. In the grouping step described above in a specific embodiment only adjacent channel impulse response windows with high correlation are regarded as one group. In fact this is not a limitation of the invention: the correlation can be performed between and amongst all channel impulse response windows not just adjacent ones so that all of those having high correlation with each other can be put into one group. The specific examples shown herein were derived from neighboring cell channel impulse response combining. In fact it can be extended to home cell too. In home cells, the user equipment knows which midamble sequences and corresponding channel impulse response windows are assigned to it from the higher layer as indicated at one of the inputs to channel impulse response 30 in FIG. 2. It just doesn't know if other channel impulse response windows belong to another or the same user equipments. For those channel impulse response windows not belonging to the desired user equipment the same method can be applied. That is, correlation coefficients can be calculated among those channel impulse response windows to determine if they can be combined to improve user equipment performance.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of blind channel impulse response combining for noise mitigation in channel estimation in a TD-SCDMA receiver comprising:
   applying a correlation function to a plurality of pairs of channel impulse response windows associated with a plurality of non-desired user equipments;
   grouping all channel impulse response windows having the correlation function above a predetermined threshold as identified with a same user equipment; and
   combining a plurality of channel estimation results from an identified user equipment in a group to mitigate noise.

2. The method of claim 1 in which the correlation function is applied to a plurality of adjacent pairs of channel impulse response windows.

3. The method of claim 1 in which the correlation function is a correlation coefficient.

4. The method of claim 1 in which the combining of the channel estimation results includes maximum ratio combining.

5. The method of claim 1 in which the number of user equipments includes home cell non-desired user equipments.

6. The method of claim 1 in which the number of user equipments includes all neighbor cell user equipments.

7. The method of claim 1 in which the correlation function is generated according to:

$$\gamma_{k,l} \frac{\langle \hat{\underline{h}}_k, \hat{\underline{h}}_l \rangle}{\sqrt{\langle \hat{\underline{h}}_k, \hat{\underline{h}}_k \rangle \langle \hat{\underline{h}}_l, \hat{\underline{h}}_l \rangle}}$$

where $\hat{\underline{h}}_k$ is the $k^{th}$ CIR window and $\langle \hat{\underline{h}}_k, \hat{\underline{h}}_l \rangle$ indicates inner product of $\hat{\underline{h}}_k$ and $\hat{\underline{h}}_l$.S.

8. A system for blind channel impulse response combining for noise mitigation in channel estimation in a TD-SCDMA receiver comprising:
   a calculation circuit for applying a correlation function to a plurality of pairs of channel impulse response windows associated with a plurality of non-desired user equipments;
   a comparator channel impulse response for grouping user equipments identified with channel impulse response windows having the correlation function above a predetermined threshold; and
   a combining circuit for combining a plurality of channel impulse response windows of the user equipments in a group for mitigating noise.

9. The system of claim 8 in which the correlation function is applied to a plurality of adjacent pairs of channel impulse response windows.

10. The system of claim 8 in which the correlation function generates a correlation coefficient.

11. The system of claim 8 in which said combining circuit includes a maximum ratio combining.

12. The system of claim 8 in which the number of user equipments includes home cell non-desired user equipments.

13. The system of claim 8 in which the number of user equipments includes all neighbor cell user equipments.

14. The system of claim 8 in which the correlation function is generated according to:

$$\gamma_{k,l} \frac{\langle \hat{\underline{h}}_k, \hat{\underline{h}}_l \rangle}{\sqrt{\langle \hat{\underline{h}}_k, \hat{\underline{h}}_k \rangle \langle \hat{\underline{h}}_l, \hat{\underline{h}}_l \rangle}}$$

where $\hat{\underline{h}}_k$ is the $k^{th}$ CIR window and $\langle \hat{\underline{h}}_k, \hat{\underline{h}}_l \rangle$ indicates inner product of $\hat{\underline{h}}_k$ and $\hat{\underline{h}}_l$.S.

15. A system for blind channel impulse response combining for noise mitigation in channel estimation in a TD-SCDMA receiver comprising:
   a processor configured to:
      calculate a correlation function for a plurality of pairs of channel impulse response windows associated with a plurality of different non-desired user equipments;
      grouping all channel impulse response windows having the correlation function above a predetermined threshold as identified with a same user equipment; and
      combining a plurality of channel estimation results from an identified user equipment in a group to mitigate noise.

16. The system of claim 15 in which the correlation function is applied to a plurality of adjacent pairs of channel impulse response windows.

17. The system of claim 15 in which the correlation function is a correlation coefficient.

18. The system of claim 15 in which the combining of the channel estimation results includes maximum ratio combining.

19. The system of claim 15 in which the number of user equipments includes home cell non-desired user equipments.

20. The system of claim 15 in which the number of user equipments includes neighbor cell non-desired user equipments.

* * * * *